United States Patent
Sugiyama

[11] Patent Number: 5,999,431
[45] Date of Patent: Dec. 7, 1999

[54] POWER CONTROLLER FOR A SWITCHED RELUCTANCE MOTOR WITH A HIGH FREQUENCY NOISE FILTER

[75] Inventor: Masanori Sugiyama, Aichi-pref, Japan

[73] Assignee: Aisin Seiki Kabushiki Kaisha, Kariya, Japan

[21] Appl. No.: 09/088,118

[22] Filed: Jun. 1, 1998

[30] Foreign Application Priority Data

May 30, 1997 [JP] Japan ................................. 9-142745

[51] Int. Cl.⁶ .................................................. H02M 7/797
[52] U.S. Cl. ............................. 363/95; 363/98; 318/376; 318/762
[58] Field of Search .................. 318/376–762; 363/95, 98

[56] References Cited

U.S. PATENT DOCUMENTS

| | | | |
|---|---|---|---|
| 5,729,449 | 3/1998 | Takada et al. | 363/98 |
| 5,805,438 | 9/1998 | Takada et al. | 363/98 |

FOREIGN PATENT DOCUMENTS

| | | | |
|---|---|---|---|
| 1298940 | 12/1989 | Japan | H02K 29/00 |
| 7274569 | 10/1995 | Japan | H02P 5/05 |
| 7298669 | 11/1995 | Japan | H02P 5/05 |
| 8172793 | 7/1996 | Japan | H02P 7/05 |

*Primary Examiner*—Jeffrey Sterrett
*Attorney, Agent, or Firm*—Sughrue, Mion, Zinn, Macpeak & Seas, PLLC

[57] ABSTRACT

The chopping power controller reduces switching error due to the noise in the current detected signal. The chopping power controller includes a switching member (18a) for supplying power to an electric load (1a) and a current sensor (2) for detecting electric current flowing through the electric load (1a). The detected electric current is compared by a comparator (16a, 30a) to a target value. The output from the comparator is supplied to a filter (23) for outputting identical signal (k) as the comparator (16a, 30a) after the comparator (16a, 30a) keeps the same level signal for a period of time. The switching member (18a) is turned off when the detected electric current continuously exceeds the target value for the period of time set at the filter (23). The filter (23) may removes the noise which has a shorter period than that of the filter (23). In other words, the filter (23) removes high frequency noise from the comparator (16a, 30a) in order to turn off the switching member (18a) accurately. Therefore, less switching error is generated due to high frequency noise.

5 Claims, 15 Drawing Sheets

Rising Edge Detector 29

Current Map

EX.(C34) : 52.5 [degree] Power-ON Angle
82.5 [degree] Power-OFF Angle
200 [A] Target Current Target Current Map

| Rotational Position | Target Currents | | |
|---|---|---|---|
| | First Phase | Second Phase | Third Phase |
| ⋮ | ⋮ | ⋮ | ⋮ |
| 51.0 | 0 | 0 | 192 |
| 51.5 | 0 | 0 | 195 |
| 52.0 | 0 | 0 | 198 |
| 52.5 | 0 | 0 | 200 |
| 53.0 | 0 | 0 | 200 |
| 53.5 | 0 | 0 | 200 |
| ⋮ | ⋮ | ⋮ | ⋮ |

Fig. 12
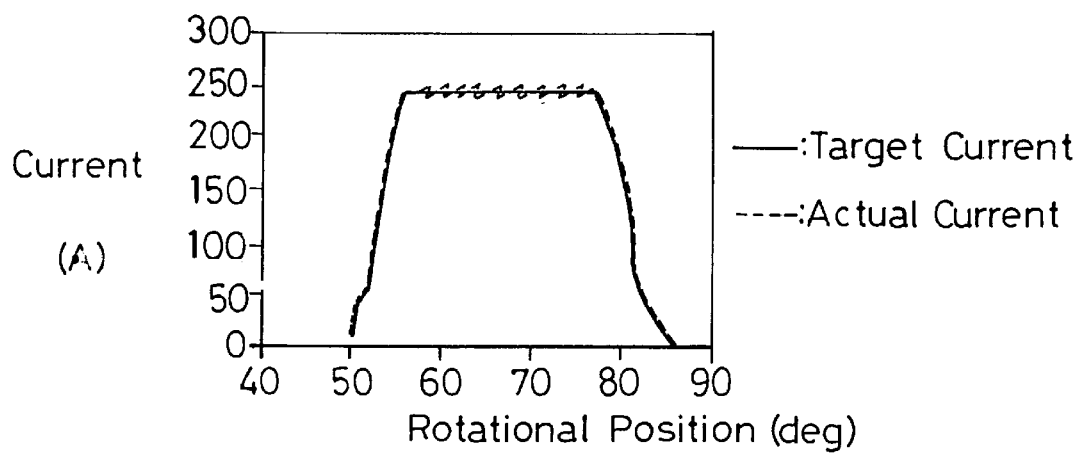
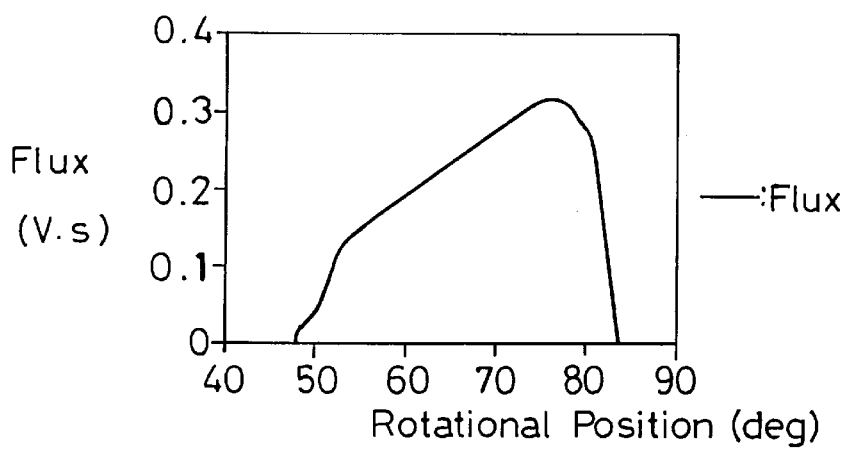
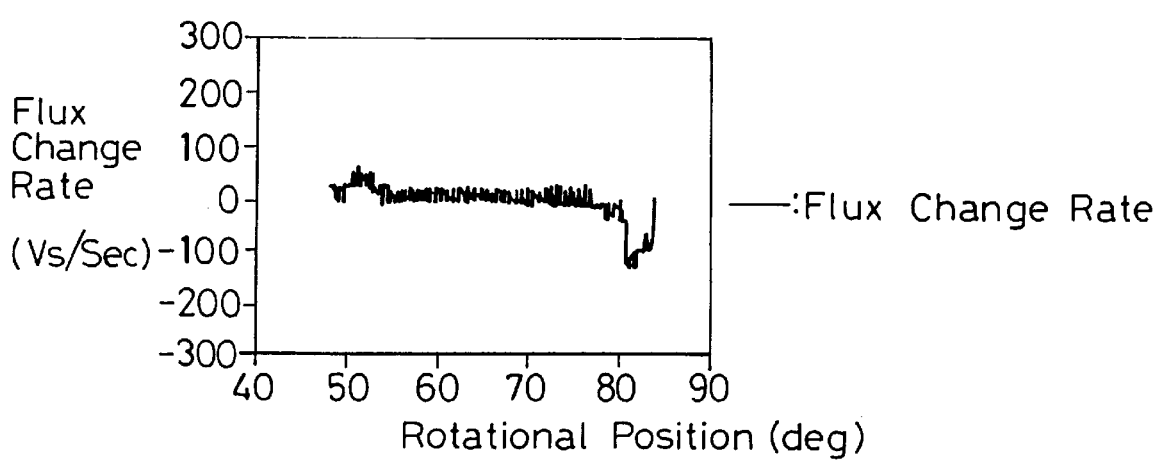

POWER CONTROLLER FOR A SWITCHED RELUCTANCE MOTOR WITH A HIGH FREQUENCY NOISE FILTER

BACKGROUND OF THE INVENTION

This application claims priority under 35 U.S.C. §§119 and/or 365 to "THE CHOPPING POWER SUPPLY CONTROLLER", Application No. H9-142745 filed in JAPAN on May 30, 1997, the entire content of which is herein incorporated by reference. This invention relates to a chopping power controller for supplying electric power to an electric load. More particularly, this invention relates to a switching circuit for a chopping power controller for supplying electric power to a switched reluctance motor.

Referring now to FIGS. 14(a), 14(b), 14(c), 15(a), 15(b), 15(c), 16(a) and 16(b), a switching circuit is disclosed for a power supplying circuit which supplies an electric power to a switched reluctance motor. A switched reluctance motor (hereinafter SR motor) generally comprises a rotor having outwardly projected magnetic poles and a stator having inwardly projected magnetic poles. The rotor includes a laminated core with steel plates. The rotor includes coils wound around the magnetic poles. The rotor of the SR motor rotates when poles of the rotor are attracted by poles of the stator. Accordingly, in order to rotate the rotor in a desired direction, coils have to receive electric current in certain order depending upon a rotational position of the rotor. For an example, such conventional SR motor is disclosed in Japanese Laid Open Patent Publication H01-298940.

In the conventional SR motor, magnetic attraction is rapidly changed due to the current being switched from one coil to another depending on the position of the poles of the rotor. The rapid changes of the magnetic attraction will cause relatively large mechanical vibration, which generates undesirable noises.

The Japanese Publication discloses a scheme to generate a rotational position signal with gradual rising and falling edges. The publication also discloses a scheme to supply electric current to the stator coils with gradual rising and falling edges based upon said rotational position signal. By such gradual changes of the electric current, the vibration and the noise may be reduced. However, in such a conventional scheme, the vibration and noise reduction may not be significant when the rotor rotates slowly because the rising and falling edges of the supplied current change rapidly due to the rotational position signal. On the contrary, in the conventional scheme, output torque may be deteriorated when the rotor rotates fast because the coils receive the electric current in a short time and rising and falling edges of the supplied current change gradually due to the rotational position signal. Efficiency and output torque of the SR motor may not be good enough unless the switching timing of the supplying current is regulated based upon the desired rotational speed and output torque.

Japanese Laid Open Publication Nos. H07-274569, H07-298669 and H08-1 72793 disclose pulse width modulation circuits for smooth transition of the electric current supplied to the motor and switching mode control for increase of output torque. For example, an H-shaped switching circuit supplies electric power to a coil 1a which is one of three coils of a three-phase motor. The switching circuit includes the first switching element 18a, the second switching element 18b, the first diode D1 and the second diode D2. The first switching circuit 18a is interconnected between one end of an electric coil 1a and the first power supplying line 18e. The second switching circuit 18b is interconnected between the other end of the electric coil Ia and the second power supplying line 18f. The first diode D1 is interconnected between one end of the electric coil 1a and the second power supplying line 18f so as to allow one-way electric current from the second power supplying line 18f to the electric coil 1a. The second diode D2 is interconnected between the other end of the electric coil i a and the first power supplying line 18e so as to allow one-way electric current from the electric coil 1a to the first power supplying line 18e. A current sensor detects the amount of electric current flowing through the electric coil 1a. The switching elements 18a and 18b are turned on when the detected current is less than a target value (Vr1). The switching elements 18a and 18b are turned off when the detected current exceeds a target value (Vr2). In other words, chopped electric power is supplied to the electric coil 1a based on the comparison among the detected current and the target values (Vr1, Vr2).

As shown in FIG. 14(a), an electric current flows through the electric coil 1a when the switching elements 18a and 18b are turned on. On the contrary, as shown in FIG. 14(b), a regenerative electric current flows through the electric coil 1a when the switching elements 18a and 18b are turned off. As shown in FIG. 14(c), a greatly waved current flows through the electric coil 1a when the switching elements 18a and 18b are repeatedly turned on and off together. In this application, this switching mode is called "hard chopping". Under the hard chopping mode, the regenerative current is supplied to the first power supply line 18e to be quickly weakened when both of the switching elements 18a and 18b are turned off. In this configuration, the current varies greatly in response to the operation of the switching element 18a and 18b. Thus the attractive force applied to the rotor may be varied greatly due to the greatly waved electric current.

As shown in FIG. 15(c), less waved current flows the electric coil 1a when FIG. 15(a) and FIG.15 (b) are alternatively repeated. In FIG. 15(a), both the first and the second switching elements 18a and 18b are turned on. FIG. 14(a) is identical as the FIG. 15(a). In FIG. 15(b), the first switching element 18a is turned off and the second switching element 18b keeps turning on. FIG. 15(b) shows a state when a current flowing through the coil 1a is less than the second target value (Vr2) and exceeds the first target value (Vr1). In this application, such alternation of FIGS. 15(a) and 15(b) is called "soft chopping". Under the soft chopping mode, the regenerative current is gradually decreased while the first switching element 18a is turned off and the second switching element 18b is turned on. Therefore, driving force of the SR motor and radial attracting force between the rotor and the stator are also gradually weakened. Accordingly, less vibration and noise may be generated under the soft chopping mode.

Some conventional power controllers select one of the hard and soft chopping modes by referring the supplied current or rotational condition of the SR motor in order to achieve low vibration and high torque. For example, Japanese laid open patent publication No. H07-274569, H07-298669 and H08-1722793 disclose such conventional power controllers.

However, high frequency noise could affect a detected signal generated by the current sensor for the electric coil 1a. Such high frequency noise could be significant when an inexpensive and simple sensor is used. FIGS. 16(a) and 16(b) show typical high frequency noises. FIG. 16(a) shows such noise under the hard chopping mode. FIG. 16(b) shows such noise under the soft chopping mode. Under the hard chopping mode, relatively large noise is generated because the supplied current is greatly changed by the chopping control. The switching elements may be unexpectedly turned off by such noise immediately after the turn on if such chopping control is based on the target values (Vr1, Vr2) as explained. This problem may happen more frequently under the hard chopping mode if compared to the soft chopping mode because greater noise may be generated under the hard chopping mode. The chopping control may be affected by the noise for longer period of time till the regenerative current is weakened.

SUMMARY OF THE INVENTION

Accordingly, a feature of the present invention is to provide a new and improved position sensor.

Further, one of the features of this invention is to reduce switching error due to the noise in the current detected signal.

The chopping power controller of the present invention may comprise a switching member (18a) for supplying power to an electric load (1a), a current sensor (2) for detecting electric current flowing through the electric load (1a) a comparator (16a, 30a) for generating a first and a second level signals (L, H), the first level signal (L) will be generated when the detected current is less than a target value, the second level signal (H) is generated when the detected current exceeds the target value, a filter member (23) for outputting identical signal (k) as the comparator (16a, 30a) after the comparator (16a, 30a) kept the same level signal for a period of time, and a switching signal output member (24–26) for turning off the switching member (18a) while the filter member (23) generates the second level signal (H).

In the above configuration, the filter member may remove the noise which has a shorter period than that of the filter member. In other words, the filter member (23) removes the high frequency noise from the switching signal generated by the comparator in order to generate an accurate switching signal corresponding to the detected electric current. Therefore, less switching error is generated due to the high frequency noise.

It is possible to change the time period of the filter member (23) depending on a subsequent output from the comparator (16a, 30a). In one preferable embodiment, the time period may be set at 10 or 1.25 microsecond when the output signal of the comparator (16a, 30a) rises from the first level (L) to the second level (H). The time period is set at zero microsecond when the output signal of the comparator (16a, 30a) falls from the second level (H) to the first level (L). Due to these settings, the output signal of the filter member (23) is switched from the first level (L) to the second level (H) after the comparator (16a, 30a) keeps the second level output (H) for 10 or 1.25 microseconds. When the comparator (16a, 30a) changes its output due to the high frequency noise, filter member (23) does not change its output signal since such changes of the comparator (16a, 30a) would not be extended for 10 or 1.25 microseconds. On the other hand, the output signal of the filter member (23) may be changed to the first level (L) immediately after the comparator (16a, 39a) generates the first level signal (L). Therefore, there is no substantial delay for the filter member (23) to generate the first level (L) output. This means less reduction of the chopping frequency due to the delay of the filter member (23).

The chopping power controller of the present invention may also comprise a first switching means (18a) interconnected between one end of a load (1a) and a first power line (18e), a second switching means (18b) interconnected between the other end of the load (1a) and a second power line (18f), first diode (18c) interconnected between the one end of the load (1a) and the second power line (2f), the first diode allows the electric current to flow from the second power line (18f) to the load (1a), second diode (18d) interconnected between the other end of the load and the first power line (18e), the second diode allows the electric current to flow from the load (1a) to the first power line (18e), mode selecting means (16a, 16b, 21) for generating mode selecting signal (d) which selects either a hard chopping mode or a soft chopping mode, the second switching means (18b) is intermittently turned on under the hard chopping mode, the second switching means (18b) is continuously turned on under the soft chopping mode, detecting means for detecting the electric current flowing through the load (1a), a comparing means (16a, 30a) for generating either one of a first level signal (L) or a second level signal (H), the first level signal (L) is generated when the detected electric current is less than a desired level, the second level signal is generated when the detected electric current exceeds the desired level, a filtering time setting means for setting a filtering time to either one of a long time (10 microseconds) or a short time (1.25 microseconds), the long time is set under the hard chopping mode, the short time is set under the soft chopping mode, filtering means for generating the second level signal (H) after the comparing means keeps the second level signal for a time period set by the filtering time setting means and switching signal generating means (24–26) for turning off one or both of the first and the second switching means (18a, 18b) while the filter means generates the second level signal (H), the first and the second switching means (18a, 18b) are both turned off under the hard chopping mode, the first switching means (18a) is turned off and the second switching means (18b) is turned on under the soft chopping mode.

The filtering means (23) eliminates the high frequency noise with relatively longer period under hard chopping mode. Further, the filtering means (23) eliminates the high frequency noise with relatively shorter period under soft chopping mode. Thus, the filtering means (23) may generate an accurate switching signal corresponding to the detected electric current so that the high frequency noise may not cause switching error.

As explained, a noise-affected time period under the hard chopping mode is longer than that under the soft chopping mode. Therefore, if the time setting for the filtering means is optimized for one mode, the noise of the other mode may not be eliminated completely or chopping operation may be deteriorated under the other mode due to unsuitable filtering function. However, in this embodiment, the filter member works well since an optimized setting time is selected based on the chopping modes.

BRIEF DESCRIPTION OF THE DRAWINGS

FIG. 12 is a time chart showing a current, magnetic flux and variation of the magnetic flux under a gradual power control of an SR motor.

PREFERRED EMBODIMENTS

Figure 1:
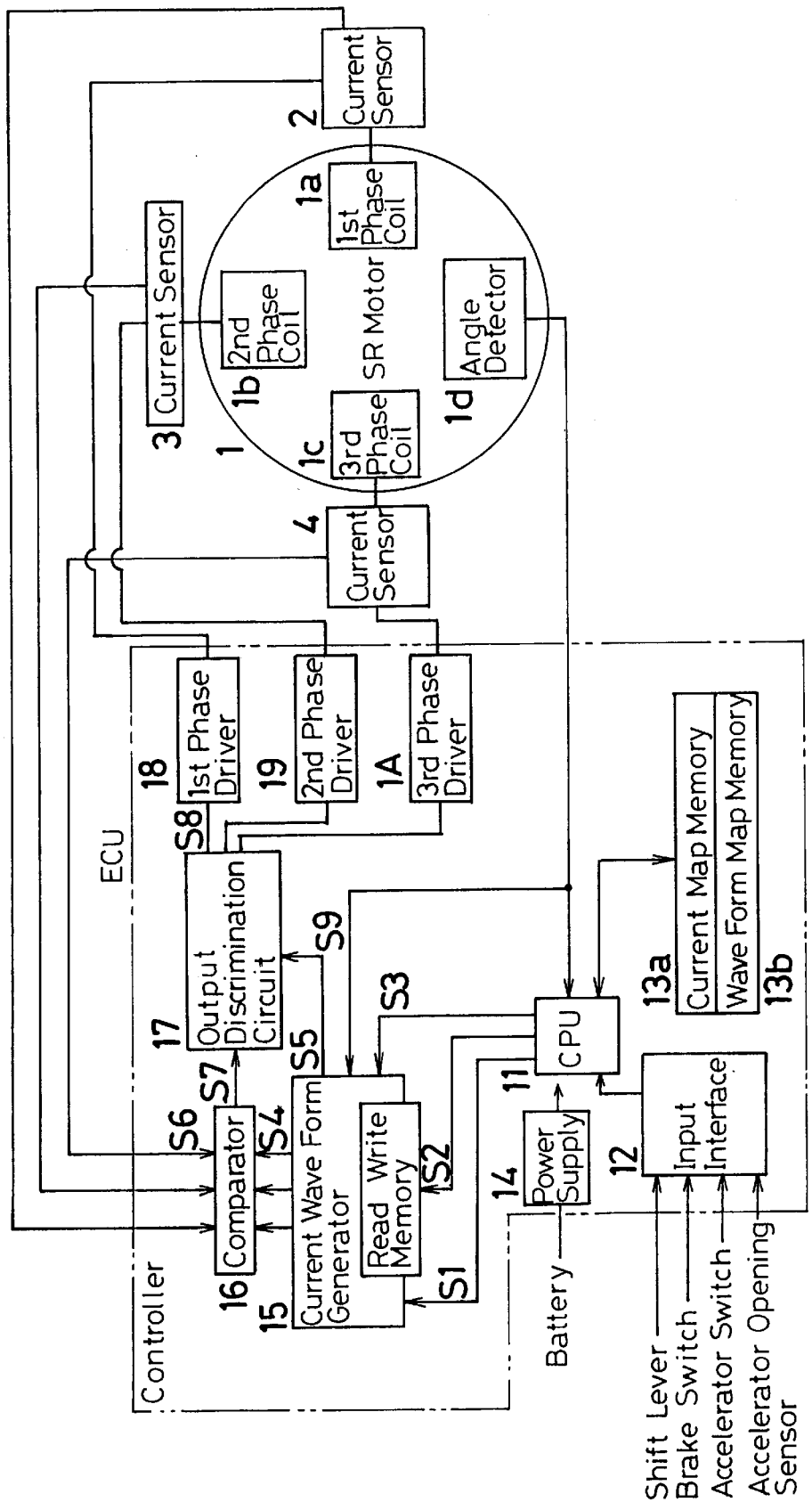
FIG. 1 is a circuit diagram for an embodiment of the present invention.

FIG. 1 shows the first embodiment of the present invention. The first embodiment is a part of the driving unit of an electric vehicle. In this embodiment, an SR motor 1 is included as the driving power source. The SR motor 1 is controlled by a controller ECU. The controller ECU controls the SR motor 1 based on a shift lever, a brake switch, an acceleration switch and an angular position detector for the accelerator. Electric power is supplied from an onboard battery.

The SR motor 1 includes three-phase coils 1a, 1b and 1c to drive a rotor. The SR motor 1 also includes an angle detector 1d. The coils 1a, 1b, and 1c are connected to the drivers 18, 19 and 1A of the controller ECU. Current sensors 2, 3 and 4 are provided around power cables which connect the coils 1a, 1b, 1c to the drivers 18, 19, 1A. The current sensors 2, 3, 4 detect the electric currents flowing through the coils 1a, 1b and 1c. The current sensors 2, 3, 4 generate voltage signals S6 in response to the actual electric currents flowing through the coils 1a, 1b and 1c.

The controller ECU includes a CPU (microprocessor) 11, an input interface 12, a memory chip 13a storing a current map, a memory chip 13b storing a waveform map, a power supply 14, a current waveform generator 15, a comparator 16, an output discrimination circuit 17 and the drivers 18, 19 and 1A. The controller ECU regularly calculates desired rotational direction, rotational speed and driving torque of the SR motor 1. The controller ECU controls the currents supplied to the coils 1a, 1b and 1c of the SR motor 1 based on the result of the calculation.

The angle detector 1d generates 11-bit binary signal that represents absolute value of the rotational angle of the rotor. The angle detector id may detect a rotational position from zero to 360 degrees with 0.35 degree resolution.

Figure 2:
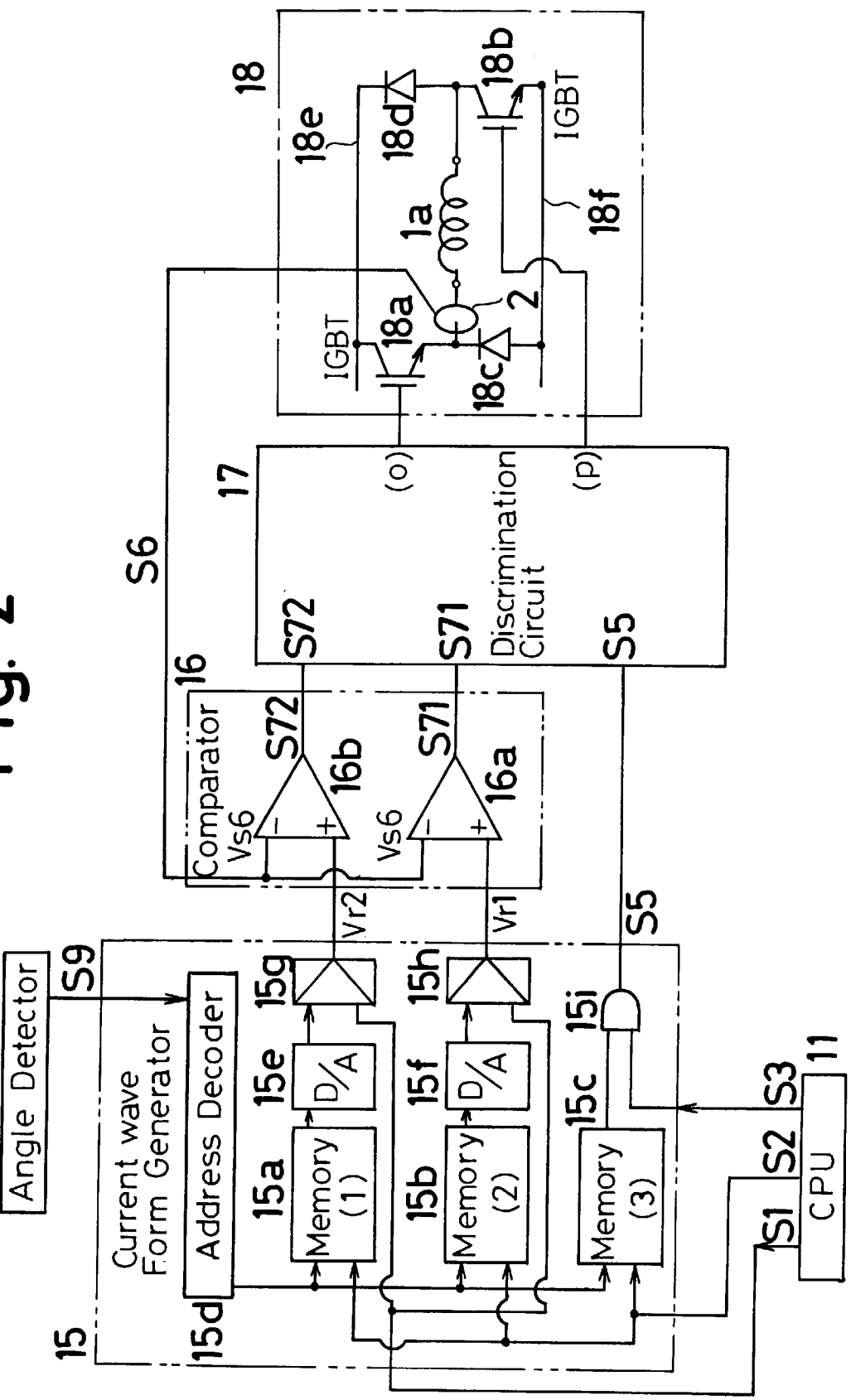
FIG. 2 is a detailed block diagram showing one of three driving circuits shown in FIG. 1.

FIG. 2 shows a detailed block diagram of a power control circuit shown in FIG. 1. The controller ECU includes two more identical power control circuits (not shown) for the coils 1b and 1c although FIG. 2 only shows a power control circuit for the coil 1a.

Referring to FIG. 2, one end of the coil 1a is connected to the high voltage line 18e through a switching transistor 18a. The other end of the coil 1a is connected to the low voltage line 18f through a switching transistor 18b. A diode 18c is interconnected between the emitter of the transistor 18a and the low voltage line 18f. A diode 18d is interconnected between the collector of transistor 18b and the high voltage line 18e. Therefore, an electric current flows between the power lines 18e and 18f through the coil 1a while both of the transistors 18a and 18b are turned on. On the contrary, the power supply to the coil 1a may be stopped while one or both of the transistors 18a and 18b are turned off.

The comparator 16 further comprises analog comparators 16a and 16b. The analog comparator 16a compares a first reference voltage Vr1 to an actual voltage Vs6 of the signal S6 so as to generate a binary signal S71. The first reference voltage Vr1 is supplied from the current waveform generator 15. The signal S6 is supplied from the current detector 2. The analog comparator 16b also compares a second reference voltage Vr2 to the actual voltage Vs6 of the signal S6 so as to generate a binary signal S72. In this embodiment, the first reference voltage Vr1 is always smaller than the second reference voltage Vr2 (Vr1<Vr2).

When the signal S5 is at the high level H, the transistors 18a and 18b of the driver 18 will be controlled as shown in Table 1 in accordance with the actual voltage Vs6 of the signal S6, the first reference voltage Vr1 and the second reference voltage Vr2:

TABLE 1

|  | (i)<br>Vs6 ≦ Vr1 | (ii)<br>Vr1 < Vs6 ≦ Vr2 | (iii)<br>Vs6 > Vr2 |
| --- | --- | --- | --- |
| signal S71 | H | L | L |
| input signal of filter 23 | L | H | H |
| signal S72 | H | H | L |
| output signals from discrimination circuit 17 |  |  |  |
| o | H | L | L |
| p | H | H | L |
| transistor 18a | On | Off | Off |
| transistor 18b | On | On | Off |

Figure 14A:
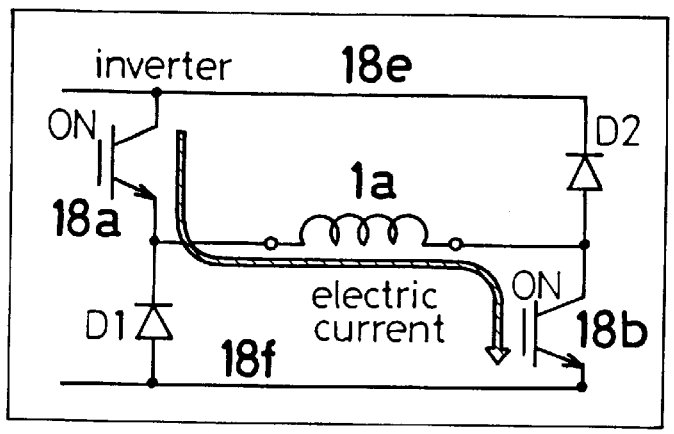
FIGS. 14(a) and 14(b) are circuit diagrams showing currents flowing under a hard chopping mode.
Figure 14B:
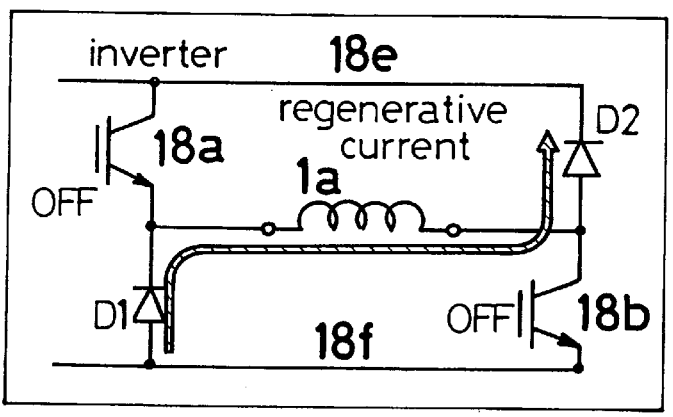
Figure 14C:
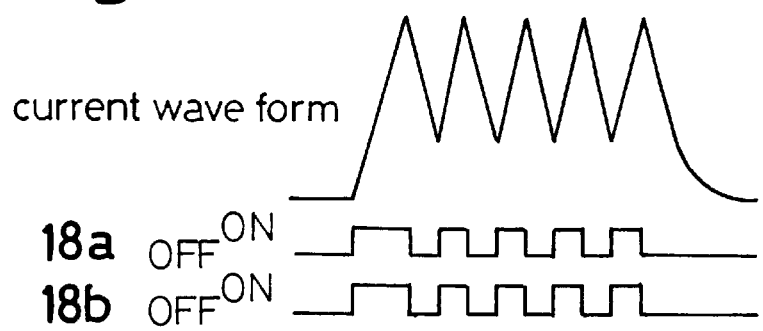
FIG. 14(c) is a time chart showing waveforms under hard chopping mode.
Figure 15A:
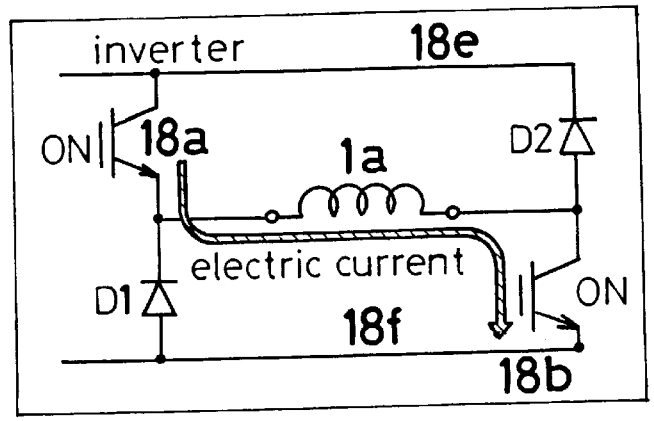
FIGS. 15(a) and 15(b) are circuit diagrams showing currents flowing under a soft chopping mode.
Figure 15B:
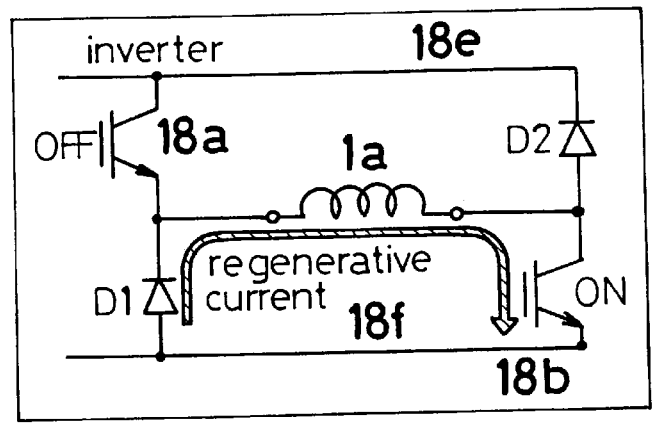
Figure 15C:
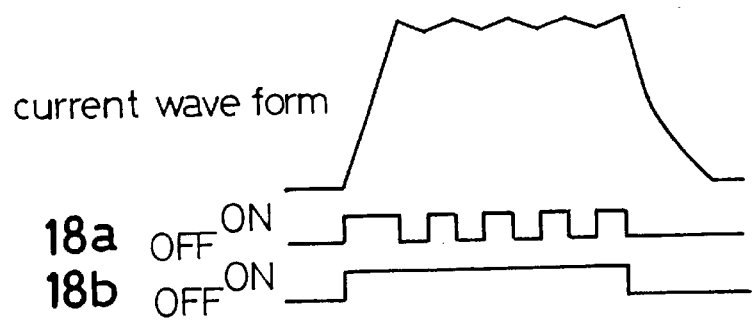
FIG. 15c is a time chart showing wave forms under a soft chopping mode.
Figure 16A:
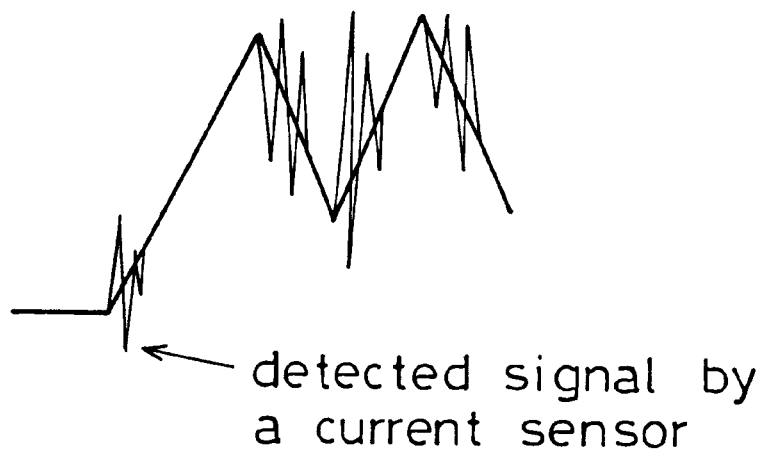
FIGS. 16(a) and 16(b) show typical noises under hard and soft chopping modes.
Figure 16B:
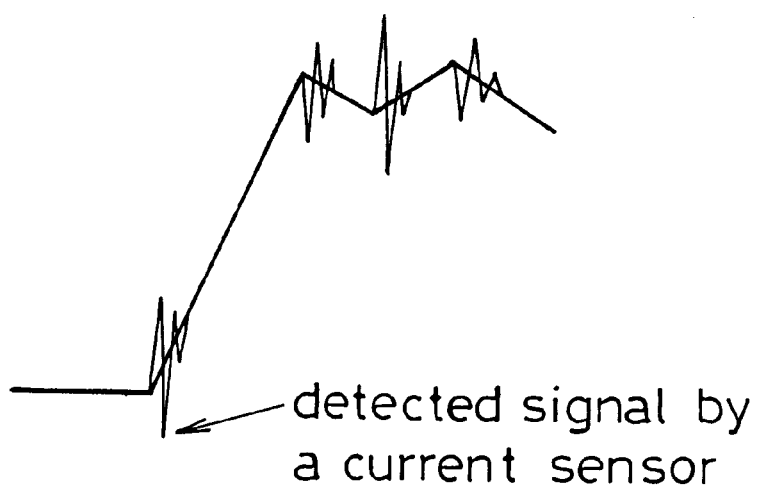

FIGS. 14(a) and 15(a) represent the above condition (i). FIG. 14(b) represents the above condition (ii). FIG. 15(b) represents the above condition (iii). Under the hard chopping mode, the above conditions (i) and (iii) are altered. Under the soft chopping mode, the above conditions (i) and (ii) are altered.

As explained above, in this embodiment, depending on the actual voltage Vs6 of the signal S6, the transistors 18a and 18b may be turned on and off independently.

Upon turning on of the transistors 18a and 18b, the electric current starts flowing through the coil 1a. Rising characteristic of the start-up current is determined by the time constant of the circuit and is not subject to control. However, this embodiment has two ways to cut the electric current flowing through the coil 1a. One way is to turn off the transistors 18a and 18b at the same time. The other way is to turn off the transistor 18a and to keep the transistor 18b turned on. Falling characteristic of the electric current may be selected since the time constants are different. In other words, the electric current falls sharply when both transistors 18a and 18b are turned off at the same time. The electric current falls gradually when the transistor 18a is turned off and the transistor 18b is kept on.

The actual voltage Vs6 is always smaller than the reference voltage Vr2 (Vs6<Vr2) when the reference voltages Vr1 and Vr2 have less changes. This is because the difference is not increased between the reference voltage Vr1 and the actual voltage Vs6 when the electric current decreases gradually. Accordingly, in this situation, variation of the electric current is relatively small. Further, in this embodiment, the reference voltages Vr1 and Vr2 may be changed rapidly upon switching the coil which receives the electric current. Under this situation, the actual voltage Vs6 may be larger than the reference voltage Vr2 (Vs6>Vr2) if the electric current is reduced gradually. If this is the case, to both transistors 18a and 18b are turned off at the same time so that the electric current is quickly reduced in accordance with the reference voltages Vr1 and Vr2. The electric current may be changed gradually again after the difference becomes small between the reference voltage Vr1 and the actual voltage Vs6 since reference voltages Vr1 and Vr2 may be changed less.

In this embodiment, the electric current will follow the references with less delay. Further, less vibrations and noises may be generated due to gradual change of the electric current when the reference voltages Vr1 and Vr2 have smaller changes.

As shown in Table 1, the output discrimination circuit 17 selectively turns on and off the transistors 18a and 18b in accordance with the outputs from the comparators 16a and 16b. However, the discrimination circuit 17 may unexpectedly turn off the transistors 18a and 18b due to high frequency noise. In order to prevent such an unexpected turn off from happening, a filter circuit 23 is incorporated in the discrimination circuit 17.

Figure 3:
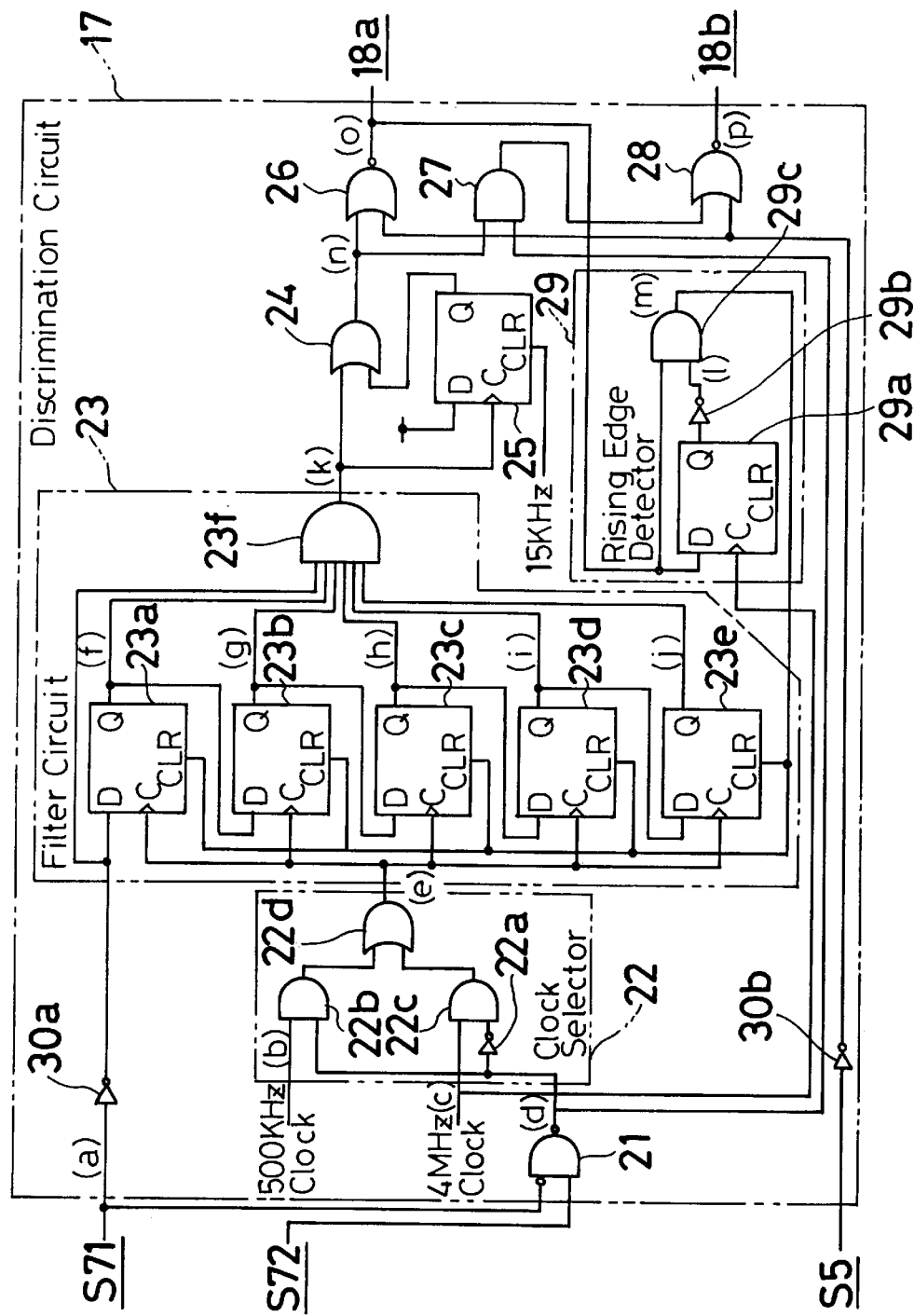
FIG. 3 is a detailed block diagram of an output discrimination circuit shown in FIGS. 1 and 2.
Figure 4:
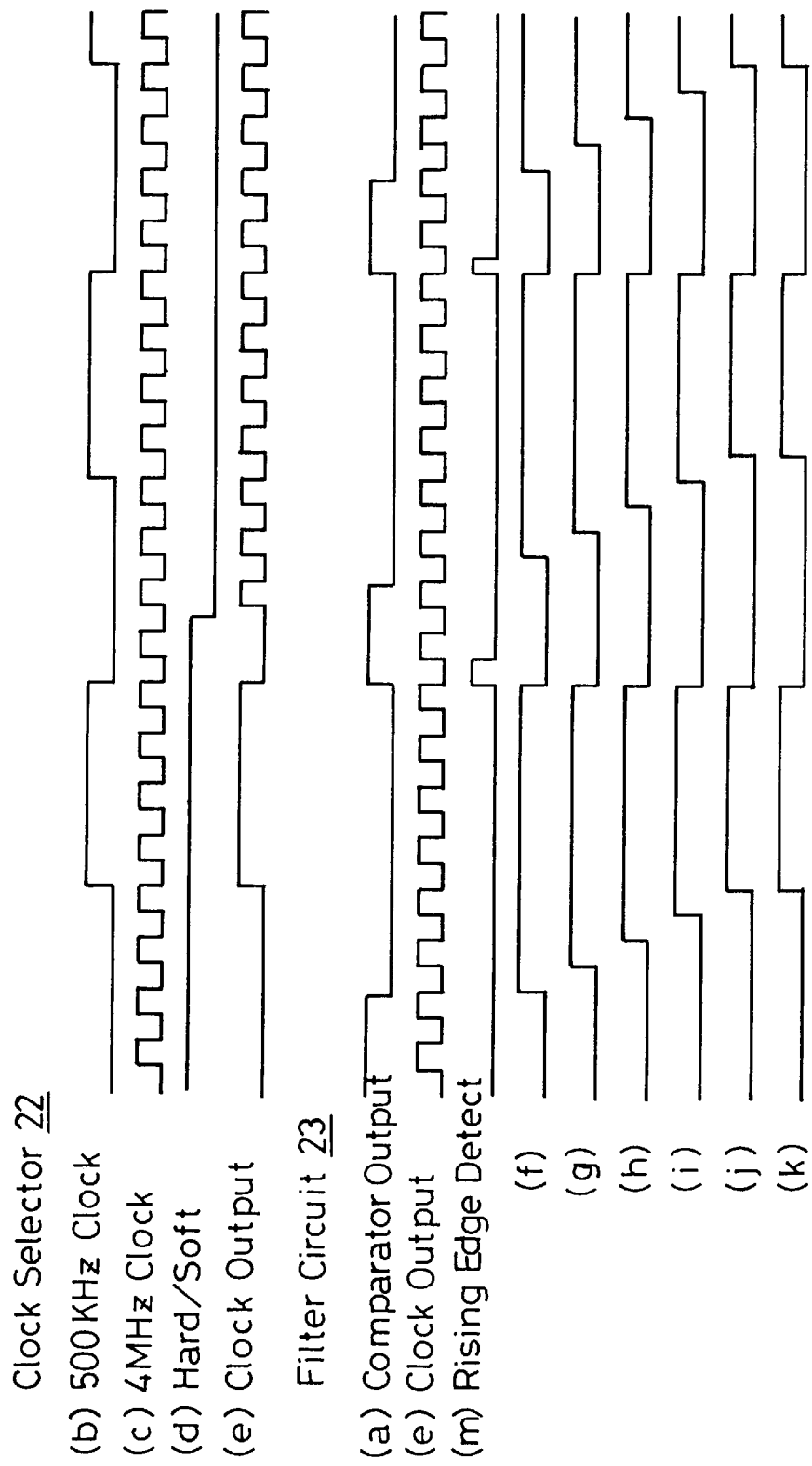
FIG. 4 is a time chart showing input and output signals of a clock selector and a filter circuit.
Figure 5:
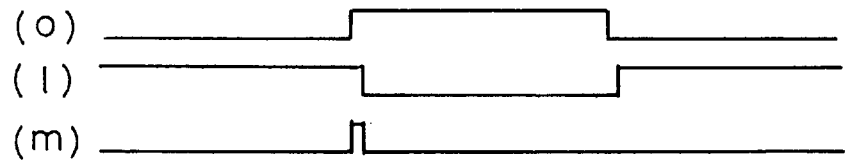
FIG. 5 is a time chart of a rising edge detector shown in FIG. 3.

FIG. 3 shows a circuit diagram of the discrimination circuit 17. FIGS. 4 and 5 shows signal time charts of the various points of the discrimination circuit 7.

The output signal S71 of the comparator 16a is supplied to the discrimination circuit 17 as a signal (a). The signal (a) is inverted by the inverter 30a and is supplied to the first flip flop 23a of a filter circuit 23. The filter circuit 23 comprises five flip flops 23a–23e and an AND gate 23f. The flip flops 23a–23e are used as a shift register with a serial input and plural outputs. The inverted signal S71 is fed to the shift register 23a–23e and is shifted synchronously in accordance with a shift clock (e).

A NAND gate 21 receives the output signal S71 from the comparator 16a and the output signal S72 from the comparator 16b. The NAND gate 21 generates a low level mode signal (d) under condition (ii) of Table 1. The low level mode signal (d) is applied to an AND gate 22b of a clock selector 22. The mode signal (d) is inverted by the inverter 22a and is supplied to an AND gate 22c. The AND gate 22c is tuned on if the mode signal (d) is at the low level (under condition (ii) of Table 1). While the AND gate 22c is turned on, 4-megahertz clock pulse (c) is applied to the shift register 23a–23e through an OR gate 22d. The AND gate 22b is turned on if the mode signal (d) is at high level (under condition (i) or (iii) of Table 1). While the AND gate 22b is turned on, 500-kilohertz clock pulse is applied to the shift register 23a–23e through the OR gate 22d.

The AND gate 23f of the filter circuit 23 generates the high level signal only when all of the plural outputs of the shift register 23a–23e are at the high level. The fifth clock pulse switches the output of the final flip flop 23e to the high level after the output signal of the inverter 30a is changed to the high level. Accordingly, the output of the AND gate 23f is switched from the low level to the high level when the inverter 30a keeps the high level output for the time period of five clock pulses. In other words, the filter circuit 23 has a time delay which corresponds to the time period of five clock pulses. Under the hard chopping mode (iii) of Table 1, such time delay is 10 microseconds =(5 pulses)×1/(500 kilohertz). Under the soft chopping mode (ii) of Table 1, such time delay is 1.25 microseconds=(5 pulses) ×1/(4 megahertz).

Under the hard chopping mode (iii), the output signal of the filter circuit 23 is switched from the low level to the high level after the output signal of the inverter 30a is kept for 10 microseconds at the high level. High frequency noise may not switch the output signal to the high level since the high frequency noise may not keep the output signal of the inverter 30a at the high level for the delay period of 10 microseconds. Accordingly, high frequency noise may be ignored and may not pass through the filter circuit 23.

The operation of the soft chopping mode (ii) is the same as the hard chopping mode (iii) except for the delay period. Under the soft chopping mode (ii), the delay period is i 0.25 microseconds, which is shorter than that of the hard chopping mode (iii).

The output signal (k) of the AND gate 23f is switched to the low level when the inverter 30a supplies a low level signal to the AND gate 23f. In other words, there is no delay to turn on the transistors 18a and 18b. The filter circuit 23 provides a necessary delay to turn off the transistors 18a and 18b so that the transistors 18a and 18b may not turn off due to high frequency noise. On the contrary, the filter circuit 23 provides no delay to turn on the transistors 18a and 18b.

The output signal (k) of the filter circuit (23) passes through an OR gate 24 and an NOR gate 26. The output signal (k) is inverted by the NOR gate 26 and becomes a driving signal (o) for the transistor 18a. The transistor 18a turns on while the driving signal (o) is at the high level. The NOR gate 26 receives the inverted signal 55 to control the electric power supplied to the first phase coil 1a. The inverted signal 55 is supplied from the current waveform generator 15 through the inverter 30b. The inverted signal 85 is at the low level while the power supply period for the first phase coil 1a. On the contrary, the inverted signal 85 is at the high level while the non-power supply period for the first phase coil 1a. The output signal (o) of the NOR gate 26 becomes the high level in order to turn on the transistor 18a while the inverted signal 85 and an output signal (n) of the OR gate 24 are at the low level.

When the output signal (o) of the NOR gate 26 rises to the high level (transistor 18a on), a flip flop 29a of a rising edge detector 29 is set at high level in synchronization with the 4 megahertz clock. The high level signal is supplied from 0 terminal of the flip flop 29a to an AND gate 29c through an inverter 29b. The output signal (m) of the AND gate 29c (e.g., the output signal of the rising edge detector 29) becomes high level in synchronization with the 4 megahertz clock. The high level signal (m) is applied to clear terminals CLR of the shift register 23a–23e. The shift register 23a–23e is cleared when the high level signal (m) is applied to the clear terminals CLR so that the filter circuit 23 is initialized. When initialized, all outputs of the shift register 23a–23e become low level. Accordingly, the discrimination circuit 17 will again measure the delay period of 5 clock pulses when the high level signal is fed to the filter circuit 23.

An output Q of a flip flop 25 is set to the high level by the output signal (k) of the filter circuit (23) when the signal (k) rises to high level. After that, the output Q of the flip flop 25 will be reset to low level by a 15 kilohertz clock pulse. In case the output signal (k) is changed to low level between two sequential pulses of the 15 kilohertz clock, the output signal (n) of the OR gate 24 stays at high level till the subsequent pulse of the 15 kilohertz clock arrives since the output signal of the Q terminal is logically added to the output signal (k) of the filter circuit 23. In other words, the output signal (n) is kept at high level till arrival of the subsequent pulse of the 15 kilohertz clock. However, the output signal (n) of the OR gate 24 is synchronized with the output signal (k) of the filter circuit 23 in case the output signal (k) extends over the subsequent pulse of the 15 kilohertz clock.

In other words, the high level output signal (k) will be delayed so that the low level output signal (n) will be extended when the high level output signal (k) of the filter circuit 23 is shorter than a period of the 15 kilohertz clock pulse and both rising and falling edges of the output signal (k) appear between two sequential pulses of the 15 kilohertz clock. However, the low level output signal (n) will not be extended but will follow the output signal (k) when the rising edge of the output signal (k) is before the subsequent clock pulse and when the falling edge of the output signal (k) is after the subsequent clock pulse. The driving signals (o)=(k) will be synchronized with the 15 kilohertz clock so as to prevent chopping frequency of the transistor 18a from varying due to the delay control in accordance with the 15 kilohertz clock. In this embodiment, less noise will be generated and the chopping frequency will not become too high since the chopping frequency is stabilized around the 15 kilohertz which is higher than the audible frequency.

As an ON/OFF driving signal (p), the output signal (n) of the OR gate 24 will be supplied to the transistor 18b through an AND gate 27 and a NOR gate 28. The high level output signal (n) generates the low level driving signal (o) which turns off the transistor 18a. Under the soft chopping mode (ii) in Table 1, the transistor 18a is turned off due to the low level output signal (o) but the transistor 18b keeps turning on due to the high level output signal (p) due to the low level mode signal (d) applied to the AND gate 27.

In this embodiment, the falling speed of the electric current is switched to another falling speed based on the output signals S71 and S72 of the comparator 16. However, such switching tends to have some delay from the exact switching timing. Ideally, the falling speed should be faster when the target current falls rapidly. However, the signal S72 may not be switched to the low level (turn transistors 18a and 18b off) unless the actual current is sufficiently different from the target current. Therefore, such switching of signals S71 and S72 may have some delay so that the actual current may not follow the target current when the target current changes rapidly.

Accordingly, in this embodiment, the falling speed may be increased irrespective of the actual current (Vs6) by controlling the signal S5. In other words, to increase the falling speed of the actual current, the transistors 18a and 18b will be tuned off irrespective of the signals S71 and S72 when the signal S5 becomes low level.

Referring to FIG. 2, the current waveform generator 15 generates two kinds of reference voltages Vr1, Vr2 and one binary signal S5. The reference voltages Vr1, Vr2 and the binary signal S5 are generated based on the information stored in random access memories (RAM) 15a, 15b and 15c. The memories 15a and 15b store eight-bit data in each address. The memory 15c stores one-bit data in each address. The memories 15a and 15b supply the eight-bits data to D/A converters 15e and 15f. The converted analog signal by the D/A converter 15e is the reference voltage Vr2 after amplification by an amplifier 15g. The converted analog signal by the D/A converter 15f is the reference voltage Vr1 after amplification by an amplifier 15h. Further, an analog signal S1 is generated by a CPU 11 and is added to the inputs of the amplifiers 15g and 15h. The CPU 11 may adjust the reference voltages Vr1 and Vr2 by controlling the level of the analog signal S1. The one-bit data generated by the memory 15c becomes the signal S5 passing through an AND gate 15i. A start/stop signal S3 is also applied to the AND gate 15i. The signal S3 is always high level while the SR motor 1 rotates. Therefore, the signal S5 is identical as an output signal of the memory 15c while the SR motor 1 rotates.

The memories 15a, 15b and 15c include a lot of addresses. Each address corresponds to one of the rotational positions of the rotor. In this embodiment, each address corresponds to 0.5 degrees of the rotational positions. An address decoder 15d generates address information based on the position signal S9 which is provided by the angle detector 1d. The address information is simultaneously supplied to address inputs of the memories 15a, 15b and 15c. Accordingly, the memories 15a, 15b and 15c will output the stored data sequentially in accordance with the rotational positions of the rotor while the SR motor 1 rotates. Thus, the reference voltages Vr1 and Vr2 may be changed at every rotational position of the rotor.

Figure 6:
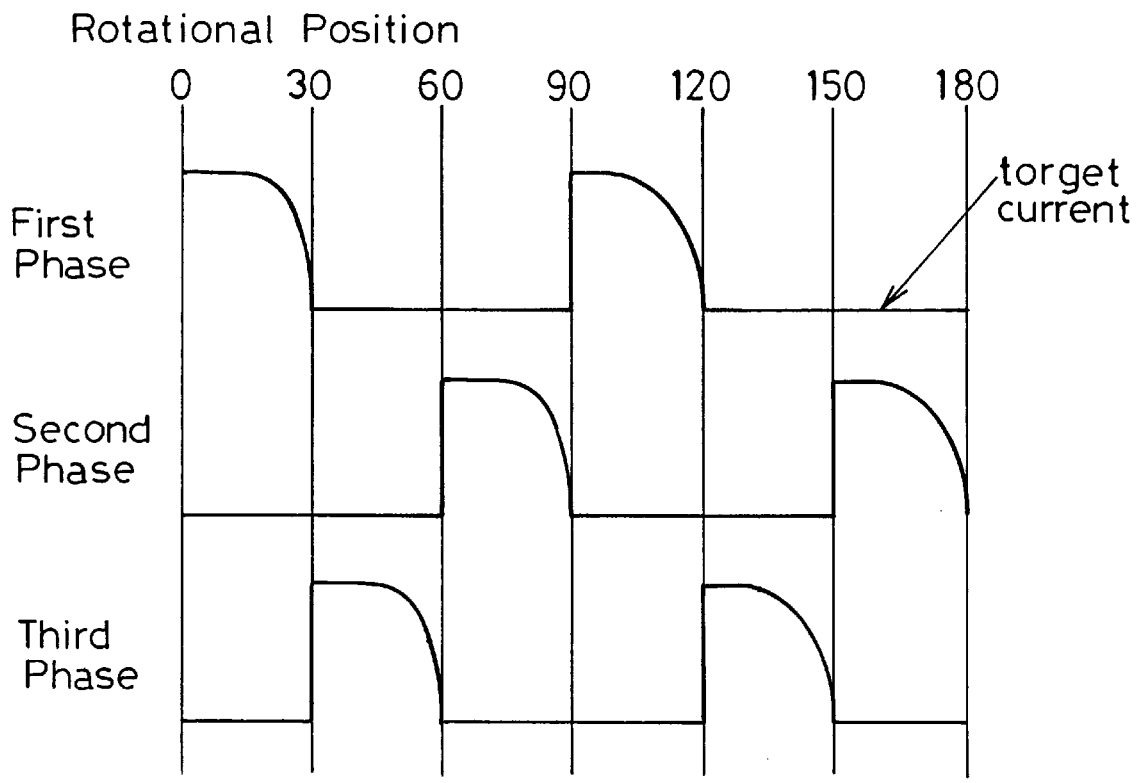
FIG. 6 is a time chart showing waveforms of target currents for the SR motor.
Figure 7:
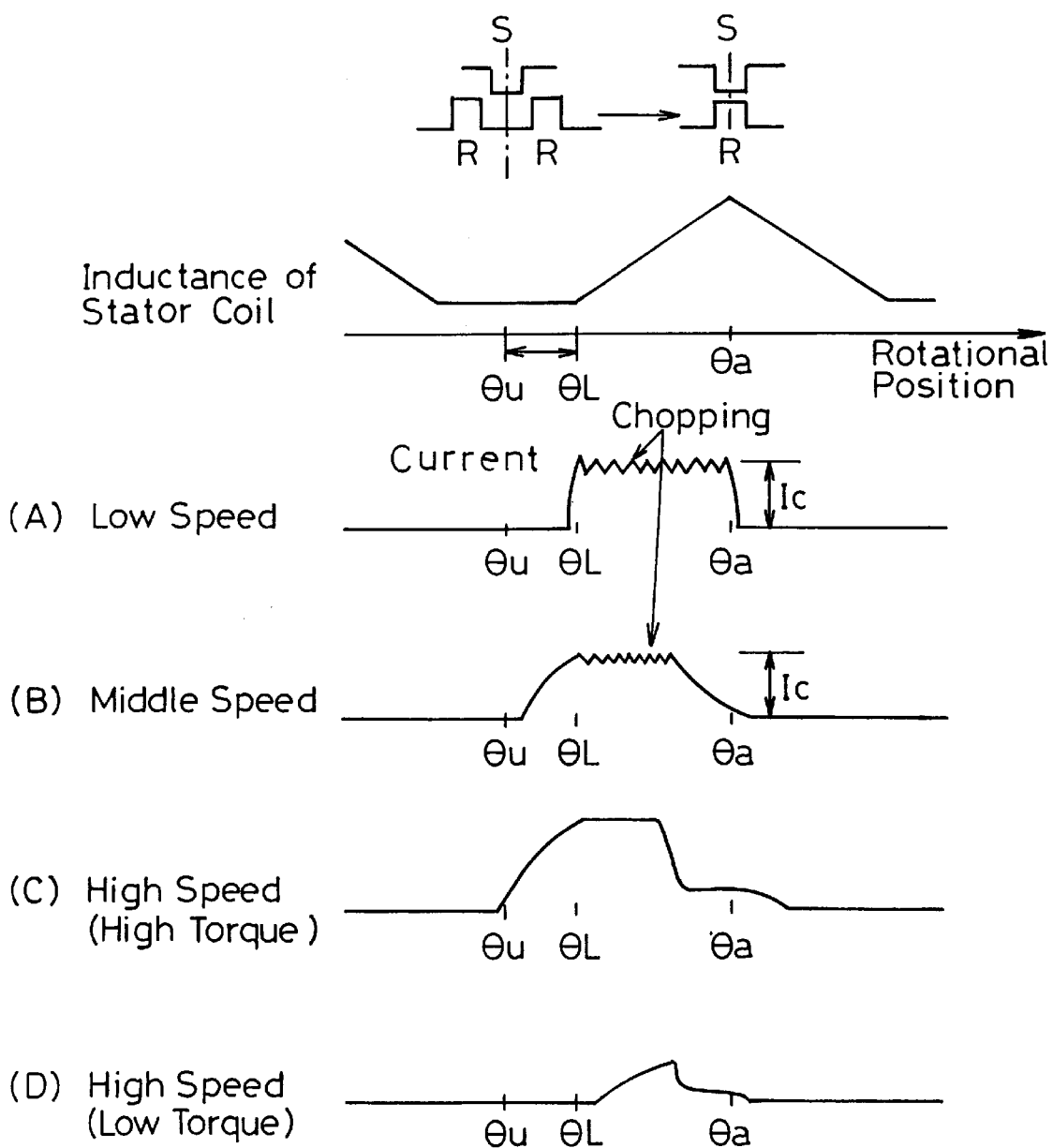
FIG. 7 is a time chart showing waveforms of supplied current to the SR motor under the various conditions.
Figure 10:
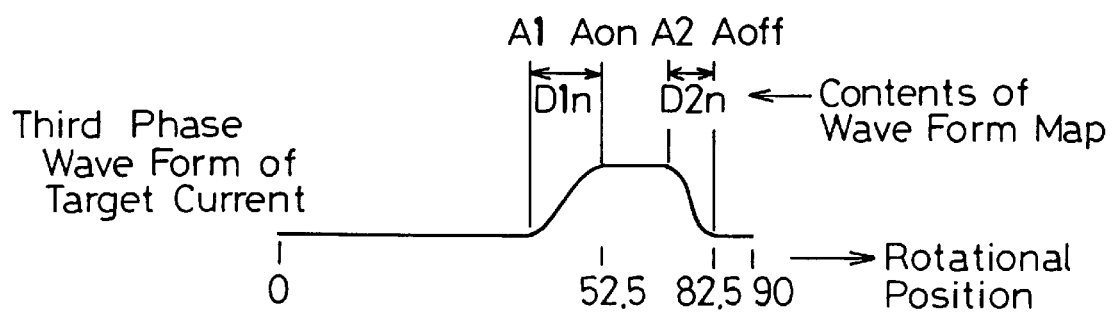
FIG. 10 is a table showing partial information of a target current map stored in memory shown in FIG. 2.
Figure 11:
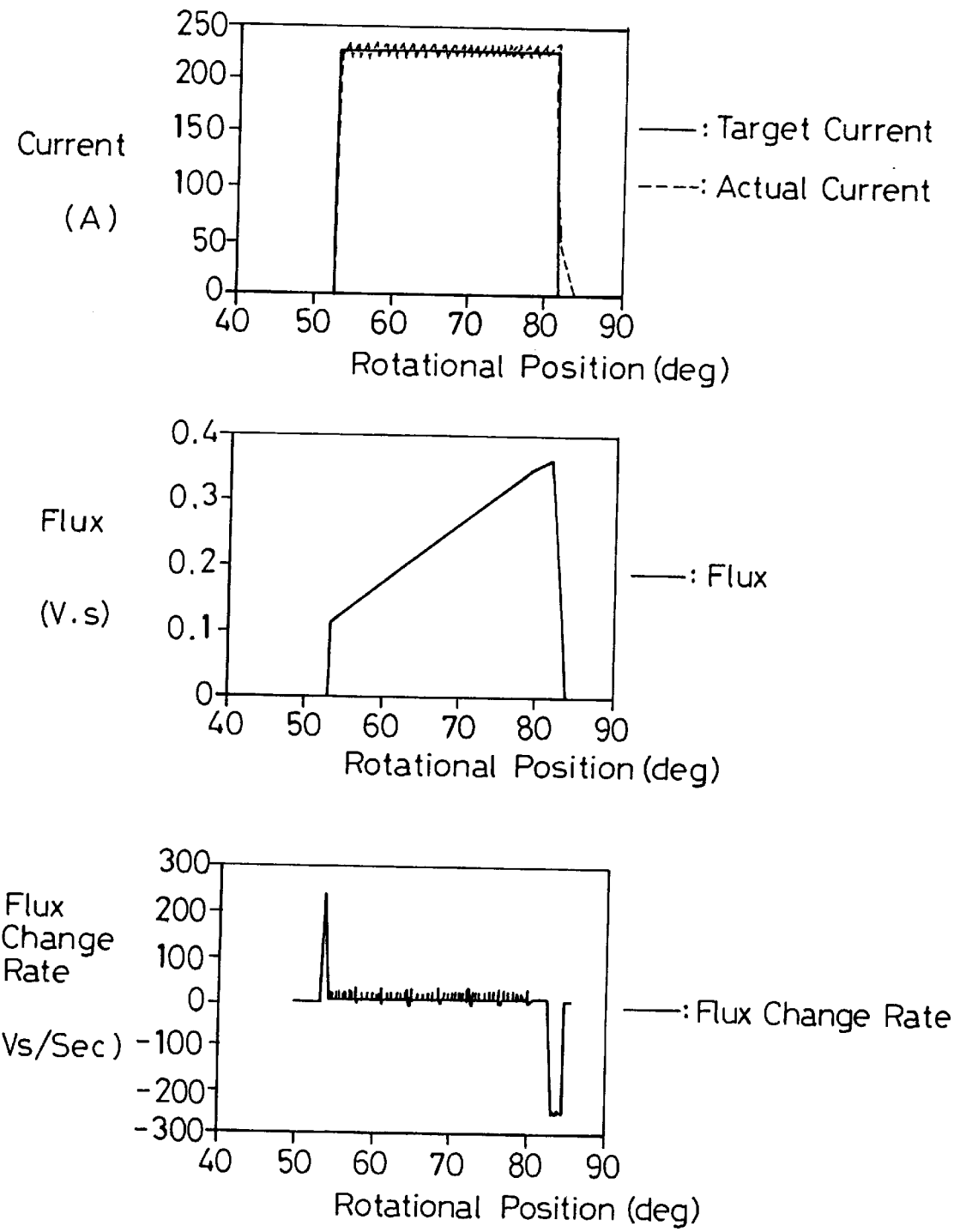
FIG. 11 is a time chart showing a current, magnetic flux and variation of the magnetic flux under a typical power control of an SR motor.

FIG. 6 shows waveforms of the target currents supplied to three coils 1a, 1b, 1c of the SR motor 1. In this embodiment, the memories 15a and 15b store information as shown in FIG. 10 in order to generate the target currents. In other words, target values for the coils 1a, 1b, 1c are stored in each address corresponding to every rotational position (i.e., every half degree). The stored information in the memory 15a is slightly different from that in the memory 15b so that Vr1 is always smaller than Vr2 (i.e., Vr2>Vr1) since the stored information in the memories 15a and 15b correspond to the reference voltages Vr1 and Vr2. As explained, the electric current may flow through the coil 1a will follow the reference voltage Vr1. Therefore, the electric current may flow through the coil 1a as shown in FIG. 6 by storing the target waveform in the memories 15a and 15b as the reference voltages Vr1 and Vr2.

In this embodiment, the electric current has to be supplied to one of the coils 1a, 1b and 1c every thirty degrees as shown in FIG. 6. The signals S71 and S72 may also be used for such current supply control by storing waveforms of respective phases in the memories 15a and 15b. In other words, the CPU 11 does not have to do such additional current supplying control.

As to the memory 15c, information "1" is stored in most of the addresses to generate the high level signal S5. However, to generate the low level signal S5 (i.e., turn transistor 18a, 18b off), the other information "0" is stored in certain addresses corresponding to the rotational positions where the reference voltages Vr1 and Vr2 need to be decreased rapidly. In other words, before the signal S72 is switched, the signal S5 is switched to the low level in accordance with the stored information in the memory 15c at predetermined positions where the electric current needs to be decreased rapidly. Such predetermined positions may correspond to, for example, the rotational positions where the reference voltages Vr1 and Vr2 start decreasing. Accordingly, in this embodiment, the response of the electric current may be changed in time without any delay so that actual electric current may be follow the target current precisely.

The memories 15a, 15b and 15c may write and read the information simultaneously. The memories 15a, 15b and 15c are connected to the CPU 11 through data lines S2. The CPU 11 renews the stored information in the memories 15a, 15b and 15c if necessary.

Figure 8:
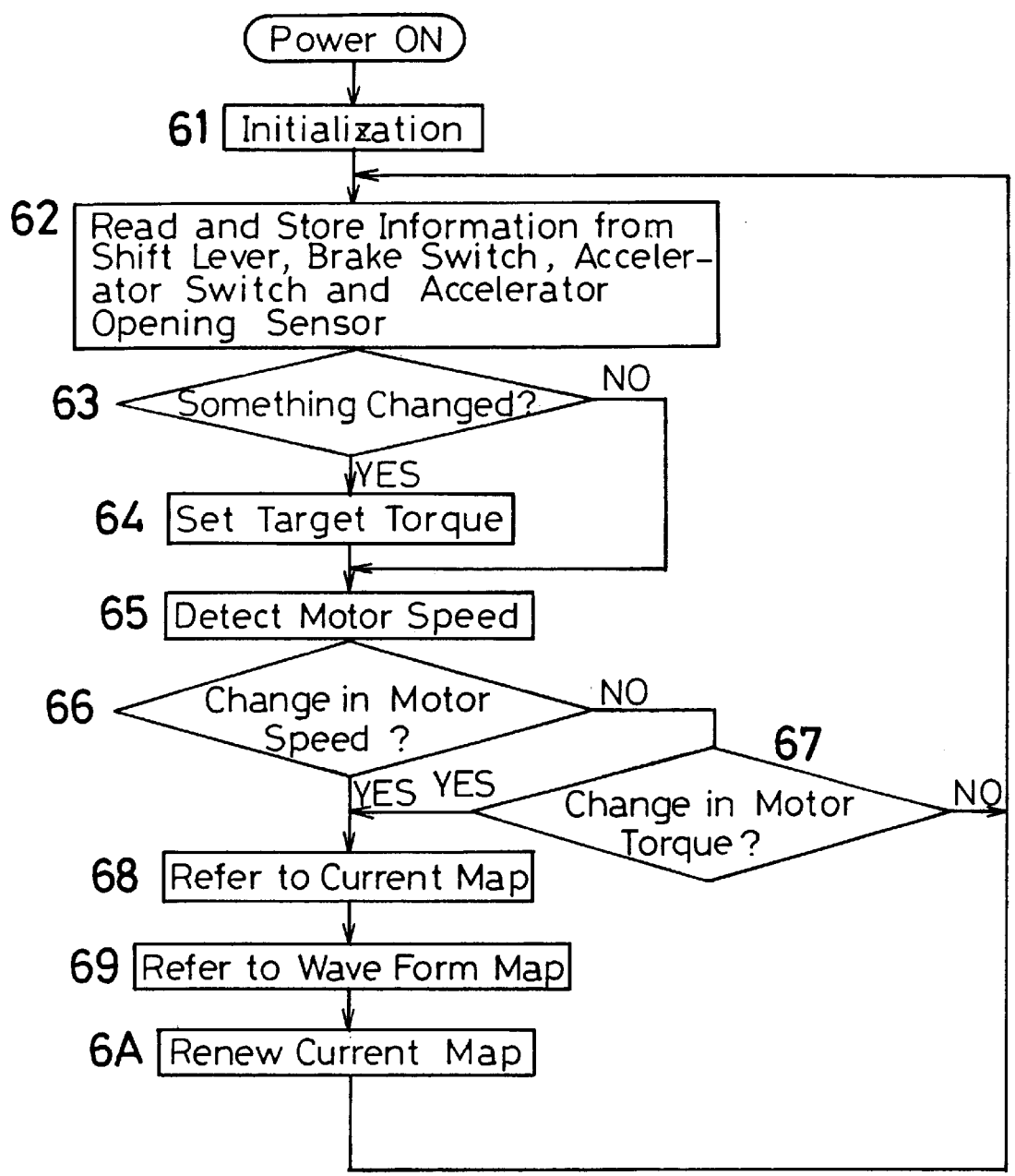
FIG. 8 is a flow chart showing operation of the CPU.

Referring to FIG. 8, the operation of the CPU 11 is explained. An initialization process is executed at step 61 upon turning the power on. In the initialization, CPU 11 sets internal memories, timers and interrupts to the initial modes. The CPU 11 further diagnoses the entire system and execute the subsequent steps if no malfunction is detected.

At step 62, the CPU 11 reads and stores information from a shift lever, a brake switch, an accelerator switch and an accelerator opening sensor. At Step 63, the CPU judges if something changed in Step 62. The CPU 11 executes Step 64 if something has changed. The CPU 11 executes Step 65 if nothing has changed.

At Step 64, the CPU 11 decides a target driving direction and a target driving torque of the SR motor 1 based on the information stored in Step 62. For example, the target driving torque is increased if the accelerator opening sensor detected a driver's command for acceleration. Further, a torque modification flag is set to indicate a change of the target torque.

At Step 65, a rotational speed of the SR motor 1 is detected. In this embodiment, eleven-bit angular position data is supplied from the angle sensor 1d. The CPU 11 calculates the rotational speed of the rotor based on a period of lower-bit changes of the eleven-bit angular data since the periodical change of the angular data is in inverse proportion to the rotational speed of the rotor. The calculated rotational speed is stored in the internal memory of the CPU 11.

Step 68 is executed after Step 66 if the rotational speed changed. Step 67 is executed after Step 66 if the rotational speed did not change. At Step 67, the torque modification flag is checked. Step 68 is executed after step 67 if the torque modification flag has been set. Otherwise, the CPU 11 executes Step 62 again.

At Step 68, information is obtained from a current map memory 13a. At Step 69, information is obtained from the waveform memory 13b. In this embodiment, the current map memory 13a and the waveform memory 13b are read only memories (ROM). The current map memory 13a stores information shown in FIG. 9. The waveform memory 14b stores information shown in FIG. 13.

Figure 9:
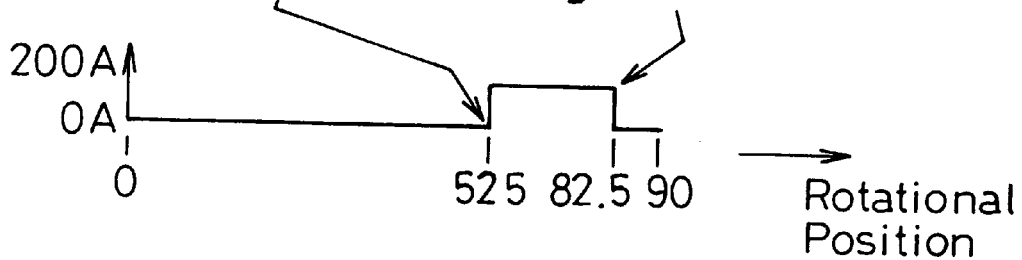
FIG. 9 is a table showing partial information of a current map stored in a current map memory shown in FIG. 1.

As shown in FIG. 9, the current map memory 13a stores a lot of data Cnm which corresponds to various target torques (n: a column corresponding to a target torque) and rotational speeds (m: a row corresponding to a rotational speed). Each data Cnm includes a power-on angle, a power-off angle and a target current. For example, data C34 corresponds to 20 N·m of the target torque and 500 rpm of the rotational speed. The data C34 contains 52.5 degrees of the power-on angle, 82.5 degrees of the power-off angle and 200 amperes of the target current. In other words, the coil 1a will receive 200 amperes of the electric current at the rotational positions from 52.5 degrees to 82.5 degrees whereas the coil 1a will receive no electric current at the other positions (e.g., from zero to 52.5 degrees and from 82.5 to 90 degrees) within a range of zero to 90 degrees.

In this embodiment, the target current may not generate a square wave. Instead of the square wave, the target current will have gradual transitions at both rising and falling edges. This waveform is stored in the waveform map memory 13b.

Figure 13:
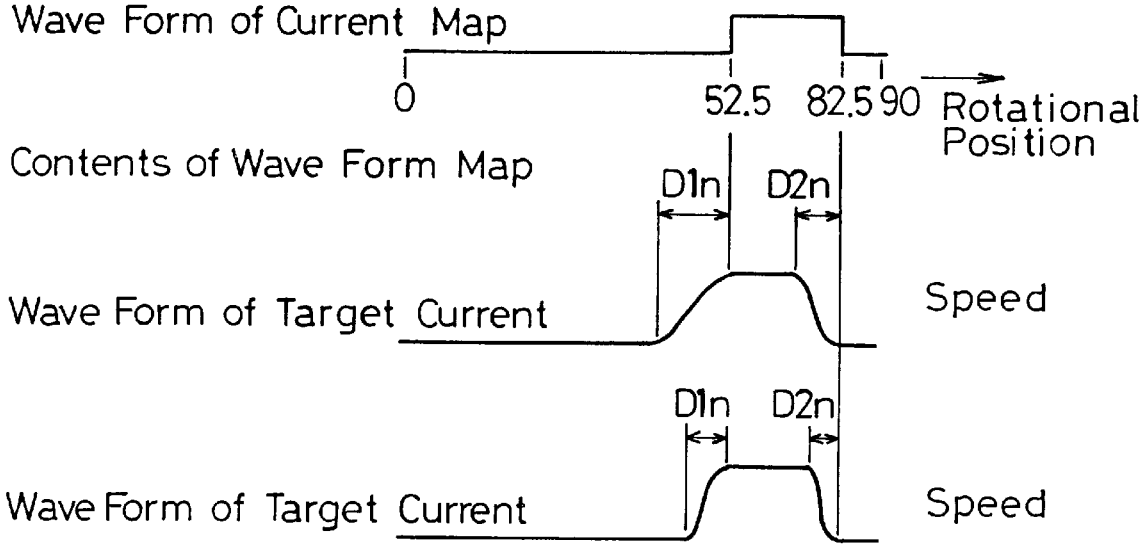
FIG. 13 is a table showing partial information stored in a waveform memory shown in FIG. 1.

As shown in FIG. 13, a lot of data D1n and D2n (n: raw number corresponding to rotational speed) are stored in the waveform map memory 13b. The data D1n are power increasing angles which correspond to necessary angles to increase the electric current from a low level (zero ampere) to a high level (200 ampere). The data D2n are power decreasing angles which correspond to necessary angles to decrease the electric current from the high level (200 ampere) to the low level (zero ampere).

For example, when data C34 is used in FIG. 9, the target current will be gradually increased from the power increasing angle D1n to the power-on angle of 82.5 degrees. The target current will become 100% at the power-on angle. On the contrary, the target current will be gradually decreased from the power decreasing angle D2n to the power-off angle of 82.5 degrees. The target current will become zero at the power-off angle.

Data D1n and D2n of the waveform memory 13b are predetermined angles to set certain transition range for increase and decrease of the target current in accordance with the rotational speed. Thus, proper data D1n and D2n are decided to sufficiently reduce vibration and noise, and not to deteriorate efficiency as much. The vibration and noise will be more significant due to a greater differential of altering magnetic flux if the current changes are so rapid. On the contrary, driving torque and efficiency will be significantly deteriorated if the transition ranges are too wide. More specifically, time periods corresponding to the power-on and power-off angles are determined to be greater than a half period of the fundamental frequency (the resonant frequency) of the SR motor 1. By doing this, less vibration and the noise will be generated since a vibration frequency generated by alternating excitations becomes lower than the fundamental frequency of the SR motor 1.

At Step 69 shown in FIG. 8, a set of data D1n and D2n is selected from the waveform map memory 13b in accordance with the rotational speed. The selected data from the waveform map memory 13b is fed to the CPU 11. For example, as shown in FIG. 13, data D14 and D24 are selected and fed to the CPU 11 when the rotational speed is at 500 rpm.

At Step 6A, new data are generated and stored in the target current map shown in FIG. 10 based on data Cnm, D1n and D2n obtained in steps 68 and 69. Based on the new target current map, the CPU 11 will update (or rewrite) the memories 15a, 15b and 15c of the current waveform generator 15 shown in 15b and 15c for coil 1a, memories for the other coils 1b and 1c are also updated.

As shown in FIG. 10, the target current is zero ampere at a rotational position A1 for the third-phase coil 1c. The rotational position A1 is equal to the power-on angle Aon minus the angle D1n (A1=Aon−D1n). At the power-on angle Aon, the target current will be determined by the data Cnm (i.e., 200 ampere). The CPU 11 will calculate intermediate targets for every 0.5 degrees so that the target currents will be increased gradually and smoothly from the rotational position A1 to the power-on angle Aon. Similar to this, the target current is determined by the data Cnm (i.e., 200 ampere) for a rotational position A2. The rotational position A2 is equal to the power-off angle Aoff minus the angle D2n (A2=Aoff−D2n). At the power-off angle Aoff, the target current is zero ampere. The CPU 11 will calculate intermediate targets of every 0.5 degrees so that the target currents will be decreased gradually and smoothly from the rotational position A2 to the power-off angle Aoff. The CPU 11 stores zero ampere at the rest of the rotational positions. For the other coils 1a and 1b, the CPU 11 will use identical data with 30 degree and 60 degree phase delays in order to renew the target current maps.

FIG. 10 only shows the data (Vr1) that will be written in the memory 15b. The data (Vr2) will have a little bigger number than the data (Vr1) and will be similarly renewed and stored in the memory 15a.

In this embodiment, currents flowing thorough the coils 1a, 1b and 1c are all controlled by the data stored in the memories 15a, 15b and 15c. Accordingly, the controller ECU will alter the excitations for the coils 1a, 1b and 1c without any additional circuit since the CPU 11 calculates and stores the target current maps for coils 1a, 1b and 1c in the memories 15a, 15b and 15c.

As shown in FIG. 8, the CPU 11 will repeat the above Steps 62–6A. The Steps 66-67-62 will be executed while the rotational speed and torque of the SR motor 1 is constant. The Steps 68-69-6A-6B will be executed to change the target current maps stored in 15a, 15b and 15c when the rotational speed and/or torque of the SR motor 1 and changed.

While the preferred embodiment has been described, variations thereto will occur to those skilled in the art within the scope of the present inventive concepts which are delineated by the following claims.

What is claimed is:

1. A chopping power controller comprising:

a switching member for supplying power to an electric load;

a current sensor for detecting electric current flowing through the electric load;

a comparator for generating a first and a second level signals, the first level signal being generated when the detected current is less than a target value, the second level signal being generated when the detected current exceeds the target value;

a filter member for outputting an identical signal as the comparator after the comparator keeps the same level signal for a period of time;

a switching signal output member for turning off the switching member when the filter member generates the second level signal; and an edge detector for initializing the filter member upon turning on of the switching member.

2. The chopping power controller according to claim 1, wherein the filter member includes time setting means to change the period of time based on the output level of the comparator.

3. The chopping controller according to claim 1, wherein the switching signal output member further includes:

a clock signal generator for generating a periodical signal; and a synchronizing member for delaying the switching member to be turned off in a synchronized manner with the periodical signal generated by the clock signal generator.

4. The chopping power controller comprising:

a first switching means interconnected between one end of a load and a first power line;

a second switching means interconnected between the other end of the load and a second power line;

a first diode interconnected between the one end of the load and the second power line, the first diode allows to flow the electric current from the second power line to the load;

a second diode interconnected between the other end of the load and the first ower line, the second diode allows the electric current to flow from the load to the first power line;

mode selecting means for generating a mode selecting signal which selects either a hard chopping mode or a soft chopping mode, the second switching means being intermittently turned on under the hard chopping mode, the second switching means is continuously turned on under the soft chopping mode;

detecting means for detecting the electric current flowing through the load;

comparing means for generating either one of a first level signal or a second level signal, the first level signal is generated when the detected electric current is less than a desired level, the second level signal is generated when the detected electric current exceeds the desired level;

filtering time setting means for setting a filtering time to either one of a long time or a short time, the long time being set under the hard chopping mode, the short time being set under the soft chopping mode;

filtering means for generating the second level signal after the comparing means keeps the second level signal for a time period set by the filtering time setting means;

switching signal generating means for turning off one or both of the first and the second switching means while the filter means generates the second level signal, the first and the second switching means are both turned off under the hard chopping mode, the first switching means is turned off and the second switching means is turned on under the soft chopping mode; and an edge detector for initializing filtering means upon turning on of the first switching means.

5. The chopping controller according to claim 4, wherein the switching signal generating means further includes:

a clock signal generating means for generating a periodical signal; and a synchronizing means for delaying the first switching means to be tuned off in a synchronized manner with the periodical signal generated by the clock signal generating means.

* * * * *